Feb. 1, 1938.  G. F. BAHR  2,106,992
SPLASH GUARD
Filed Oct. 12, 1936
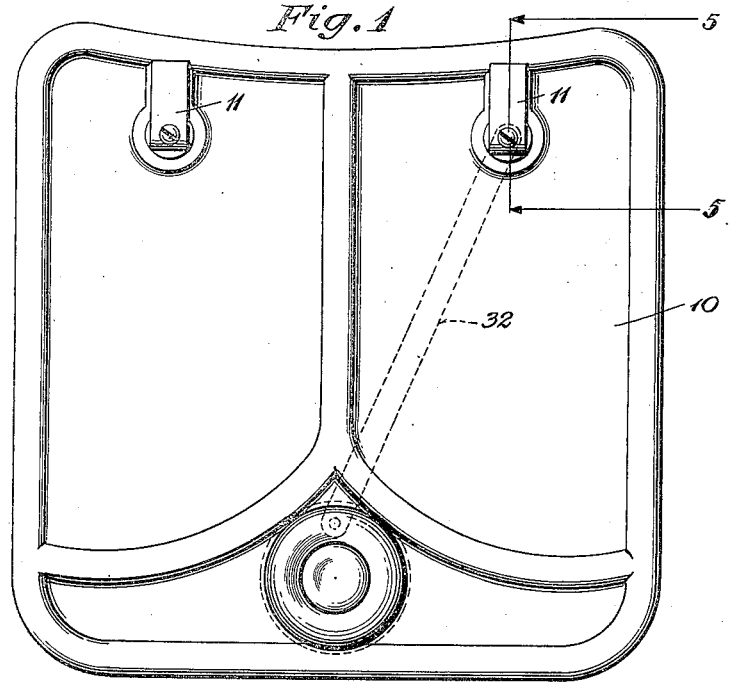
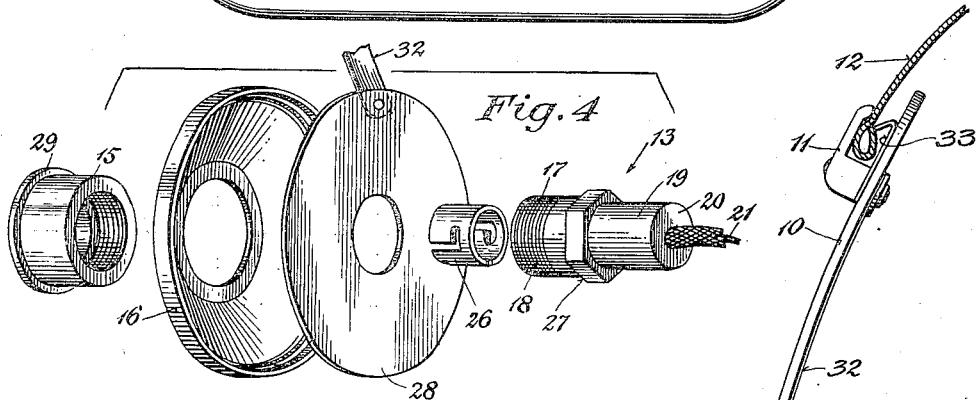
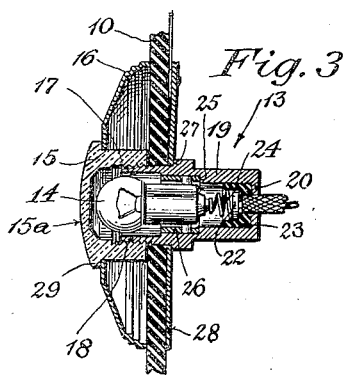
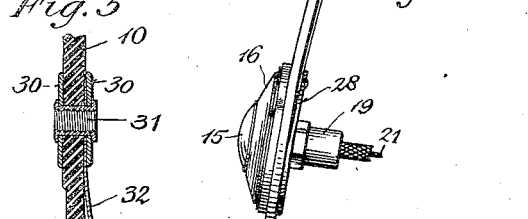
INVENTOR.
Gustave F. Bahr,
BY
ATTORNEY Patented Feb. 1, 1938

2,106,992

UNITED STATES PATENT OFFICE 2,106,992

SPLASH GUARD

Gustave F. Bahr, Fairfield, Conn., assignor to Casco Products Corporation, Bridgeport, Conn., a corporation of Connecticut Application October 12, 1936, Serial No. 105,164

6 Claims. (Cl. 240—8.1)

This invention relates to splash guards, as for motor vehicles and the like.

At the present time, motor vehicles, especially passenger automobiles, are often seen on the road at night with taillights out-of-order. Such a condition is particularly dangerous to drivers of vehicles approaching from the rear, and especially so, if such approach be around a curve, since then the headlights of the approaching vehicle do not follow the road, and do not reveal in good time the dark car ahead.

It is an object of the present invention to obviate this danger which arises due to failure of the taillight to operate properly, by providing an improved automobile splash guard carrying a separate and reliable source of illumination to function in conjunction with the usual taillight. This improved splash guard thus serves as an auxiliary to give notice of the presence of a car should its usual taillight fail to function.

The light carried by the splash guard is simple and rugged in construction, and has no reflectors or large lens parts. Therefore it will not get out-of-order easily. In addition, its location on the splash guard makes it easily accessible, so that repairs and replacement of the bulb may be simply effected. The light is constructed entirely of unbreakable parts, and extremely rugged features which make for reliability which is important in a light serving as an auxiliary to the taillight.

Also, when an automobile carrying the improved illuminated splash guard is in motion, the light carried by said guard will sway and gyrate to some extent, and thus attract the attention of motorists approaching from the rear much more quickly than would the ordinary taillight.

Furthermore, when an automobile is equipped with a pair of these splash guards, the width of the car will become defined to drivers in the rear, and this fact will further increase the safety of night driving.

Other features and advantages will hereinafter appear.
In the accompanying drawing, which shows one embodiment of the invention:

Figure 1 is a rear elevation of the improved illuminated splash guard.

Fig. 2 is a side elevation showing the guard attached to the rear bead of a rear automobile fender.

Fig. 3 is a section taken axially through the illuminating device of the guard.

Fig. 4 is an exploded view of the illuminating device.

Fig. 5 is a detail section of one of the attaching fixtures secured to the apron, taken on the line 5—5 of Fig. 1.

As shown in Figs. 1 and 2, the present invention is applied to a splash guard comprising a flexible apron 10 having attached thereto a pair of clamps 11 and adapted to grip the lower rear edge or bead of an automobile fender 12.

According to the invention, the lower portion of the apron, near the center, is provided with an illuminating translating device, which, in the embodiment shown, comprises an electric socket 13 and a bulb 14, a combined lens and nut 15 securing the socket to the apron, and an escutcheon plate 16 mounted on the apron by means of the nut 15.

The socket 13 comprises an outer metal shell 17 which is substantially tubular in shape, having its neck externally threaded, as at 18, and having a rear barrel portion 19 terminating in a centrally apertured end wall 20. A connecting wire 21 passes through the aperture in the wall 20, and is soldered to a small metal disk 22 carried in an insulating cup 23 within the barrel 19, and closely fitted to the internal bore thereof. The cup 23 also carries a conical compression spring 24, the base of which contacts the metal disk 22.

The bore of the shell 17 is stepped to provide a shoulder 25 for locating a split sleeve 26 having a pair of bayonet slots therein, said sleeve being press-fitted in place and adapted to receive and hold the pin-equipped base of the bulb 14. When the bulb 14 is inserted in the sleeve 26 the central tip of said bulb will engage and contact with the spring 24, causing the latter to be slightly compressed, thus locking the bulb in place.

For the purpose of mounting the shell on the apron 10, the shell has an external shoulder 27 adapted to engage the apron. The shell 17 preferably carries a circular metal plate 28 for the purpose of making electrical connection to the socket. The threaded neck 18 of the shell passes through an aperture in the apron 10, said neck having screwed thereon the combined nut and lens 15 which, when brought up tight, securely holds the shell to the apron 10, and draws the circular plate 28 against the back of said apron.

Preferably, the nut 15 is molded of a translucent thermoplastic material, so that light from the bulb 14 will illuminate the front lens portion 15a of the nut and pass therethrough. In order to properly and securely position the socket on the apron, and also for purposes of ornamentation, the invention provides the circular escutcheon plate 16, which is centrally apertured to permit the shank of the nut 15 to pass therethrough, said nut having at its front an external flange 29 for holding the escutcheon plate tightly against the apron. The plate 16 thus holds the nut 15 in firm alignment, and further serves to coact with the connection plate 28 in gripping a comparatively large surface of the apron. When the apron is made of a relatively soft flexible substance, such as rubber, this extensive gripping area becomes important in preventing tearing-out of the socket 13, both escutcheon 16 and plate 28 acting as washers.

The upper portion of the apron 10 is provided with a pair of metal fixtures, to which the fender clamps 11 are attached. In Fig. 5, the right-hand fixture of the apron of Fig. 1 is illustrated in section. These fixtures each comprise a pair of metal washers 30, one washer on each side of the apron 10, and a threaded sleeve 31 passing through an aperture in the apron and having its ends turned over to secure the washers in place.

For conducting current to the socket from one of the clamps 11, the invention provides a preferably flexible metal strap 32 having one end connected with the circular plate 28 above described, and having its other end held under the rear washer 30 of the fixture of Fig. 5.

The clamps 11 are shown as each having a metal jaw 33 for making electrical connection to the fender 12, which constitutes the grounding element of the electric circuit for the light. Current is thus conducted from the fender through the jaw 33 to the metal fixture and thence through the strap 32 to the plate 28, shell 17, sleeve 26, and barrel of the bulb 14. From the tip of said bulb current passes through the spring 24, disk 22, and to the connecting wire 21 which is in turn connected to the electrical circuit of the vehicle.

Preferably the escutcheon plate 16 is plated and highly polished on its outer surface, preferably having a plurality of concentric shoulders near its rim, so as to serve as a reflecting member to pick up and reflect light from the headlights of vehicles approaching from the rear.

Variations and modifications may be made within the scope of this invention and portions of the improvements may be used without others.

I claim:

1. In a splash guard, an apron having an aperture therein; an electrical socket carried in the aperture of the apron, said socket having an outer metal shell in circuit therewith, the shell having an open end passing through the apron aperture and being projected therebeyond and having an external thread on the thus projected part thereof, the shell also having an external shoulder at the back of the apron; an electric lamp carried by the socket in the open end of the shell; a nut at the front of the apron and screwed on the threaded portion of the shell for securing the latter to the apron, the nut being formed to include a housing for the bulb of the lamp including a substantially cylindrical wall around said bulb extending beyond the tip of the same; a connection plate electrically connected with the shell and held thereby against the apron, for conducting current to the bulb; and means connected with the socket for conducting current from the bulb.

2. In a splash guard, an apron having an aperture therein; an electrical socket carried in the aperture of the apron, said socket having an outer metal shell in circuit therewith, the shell having an open end passing through the apron aperture and being projected therebeyond and having an external thread on the thus projected part thereof, the shell also having an external shoulder at the back of the apron; an electric lamp carried by the socket in the open end of the shell; a nut at the front of the apron and screwed on the threaded portion of the shell for securing the latter to the apron, said nut being shaped to extend along the shell opposite the bulb of the lamp and having a lens portion overlying the outer end of said bulb; a connection plate electrically connected with the shell and held thereby against the apron, for conducting current to the bulb; and means connected with the socket for conducting current from the bulb.

3. In a splash guard; an apron having an aperture therein; an electrical socket carried in the aperture of the apron, said socket having an outer metal shell in circuit therewith, the shell having an open end passing through the apron aperture and being projected therebeyond and having an external thread on the thus projected part thereof, the shell also having an external shoulder at the back of the apron; an electric lamp carried by the socket in the open end of the shell; a nut at the front of the apron and screwed on the threaded portion of the shell for securing the latter to the apron, the nut having a chamber long enough to extend at its front end beyond the tip of the bulb; a connection plate electrically connected with the shell and held by said shoulder against the back of the apron, for conducting current to the bulb; means connected with the socket for conducting current from the bulb, and an annular reflector surrounding the nut and secured against the front of the apron, the nut having an external shoulder at its outer end, said shoulder with the apron constituting the sole means of securing the reflector on the apron.

4. A splash guard as in claim 3, in which said connecting plate is an annular disk, and said reflector is an annular member transversely arched so that its outer periphery bears against the front of the apron adjacent the outer periphery of the connecting plate at the back of the apron.

5. A splash guard as in claim 1, in which said nut also includes an outer transverse wall, the nut being made of translucent material.

6. A splash guard for a motor vehicle, comprising an apron of pliable material; means for clamping the upper end of the apron to the vehicle to suspend the apron, the apron having an aperture through its lower portion; an illuminating means including an electric lamp having a bulb; and means for mounting said lamp on the apron with the bulb passing through said aperture to project beyond the front side of the apron and for locally stiffening the apron over an annular area thereof surrounding said lamp-receiving aperture, said mounting and stiffening means including a pair of apertured disks one laid over the rear side of the apron and the other clampingly applied against the front side of the apron, the aperture in the disk at the back of the apron substantially matching the bulb-receiving aperture in the apron, a holder for the lamp having an external shoulder intermediate its length abutted against the rear side of the disk at the rear side of the apron, said holder including a shell portion having an open end within which the lamp is seated, said shell portion being projected through the aperture in the apron and being externally threaded where thus projected, and a nut at the front of the apron and secured on said thread and passing through the aperture in the disk at the front of the apron, the nut having a lens portion overlying the outer end of the bulb and beyond the same a projection engaging the front side of the disk last-mentioned.

GUSTAVE F. BAHR.